US006353510B2

(12) United States Patent
Drouin

(10) Patent No.: US 6,353,510 B2
(45) Date of Patent: Mar. 5, 2002

(54) DISK SPEED PROFILE METHOD AND DEVICE

(75) Inventor: David Drouin, Milpitas, CA (US)

(73) Assignee: Castlewood Systems, Inc., Milpitas, CA (US)

(*) Notice: Subject to any disclaimer, the term of this patent is extended or adjusted under 35 U.S.C. 154(b) by 0 days.

(21) Appl. No.: 09/833,216

(22) Filed: Apr. 10, 2001

Related U.S. Application Data

(63) Continuation of application No. 09/082,418, filed on May 20, 1998, now abandoned.
(51) Int. Cl.[7] .............................................. G11B 21/02
(52) U.S. Cl. ..................................... 360/75; 360/73.03
(58) Field of Search ............................ 360/75, 73.03, 360/264, 274, 69, 78.04

(56) References Cited

U.S. PATENT DOCUMENTS 4,965,682 A * 10/1990 Jinnai et al. .............. 360/73.03
5,303,099 A * 4/1994 Kawazoe .............. 360/73.03 X
5,412,519 A * 5/1995 Buettner et al. .......... 360/73.03
5,729,399 A * 3/1998 Albrecht et al. .............. 360/75
6,215,609 B1 * 4/2001 Yamashita et al. ....... 360/73.03

* cited by examiner

Primary Examiner—Andrew L. Sniezek
(74) Attorney, Agent, or Firm—Townsend and Townsend and Crew LLP

(57) ABSTRACT

A system having a storage device including read/write heads for repositioning the read/write heads from a parking location to a position adjacent a surface of a magnetic disk, the storage device includes a spindle motor coupled to the magnetic disk, for accelerating the magnetic disk to at least a first number of revolutions per time period while the read/write heads are positioned at the parking location, and a solenoid control coupled to the read/write heads and to the spindle motor, for biasing the read/write heads towards the position adjacent the surface of the magnetic disk after the magnetic disk reaches the first number of revolutions per time period, wherein the spindle motor maintains a rotation of the magnetic disk at less than a second number of revolutions per time period before the read/write heads are positioned adjacent the surface of the magnetic disk, and wherein the spindle motor rotates the magnetic disk at a third number of revolutions per time period after the read/write heads are positioned adjacent the surface of the magnetic disk.

14 Claims, 14 Drawing Sheets

DISK SPEED PROFILE METHOD AND DEVICE

Continuation of prior application Ser. No. 09/082,418/ May 20, 1998, now abandoned.

BACKGROUND OF THE INVENTION

The present invention generally relates to removable storage devices for electronic information. More particular, the present invention provides a technique including an apparatus and methods for the movement and operation of a storage device including a magnetic head used to read and write data into a removable disk.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "life-like" sound from the high quality stereo or surround sound system. Accordingly, the clash between Luke Skywalker and Darth Vader can now be seen as well as heard in surround sound on your own home entertainment center. In the mid-1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, and quick access capabilities.

A typical storage device includes a storage media including a magnetic disk and a read/write head for reading data from the magnetic disk. In a normal, operating mode, the read/write heads are positioned above the data storage portion of the magnetic disk. More particularly, the read/write heads "fly" above the surface of the magnetic disk and never physically touch the data storage portion of the magnetic disk.

Upon power-down of a typical storage device, the read/write heads are typically moved from a position above the data storage portion of the magnetic disk to a safe position. This safe position is typically not above the storage portion, but at a landing region located at either the inner or outer diameter of the disk; a head load/unload ramp, often located outside the outer diameter of the disk; and the like.

If the read/write heads are not reliable moved to a safe position after power-off, the read/write heads may move around the storage device causing damage to the data storage portions of the magnetic disk resulting in data loss, causing misalignments to the read/write heads, causing damage to the read/write head elements, and causing other types of damage. The potential damage with storage devices based upon magneto-resistive (MR) read/write heads is significant due to the high cost of MR heads compared to the storage device and their more delicate nature.

Present methods for unloading of read/write heads include either maintaining the rotational speed of the magnetic disk at the same speed used for conventional operation while unloading the heads or allowing the magnetic disk to slow down at its own pace while unloading the heads. Another method includes removing a drive voltage from the spindle motor and using a Back Electro-Motive Force (back EMF, VBEMF, VEMF) voltage generated by the spindle motor to power the heads to the safe position.

One concern about relying upon present methods is that because the initial radial positions of the MR heads is unpredictable, the amount of force applied by flex cables coupled to actuator arms is unpredictable, and the load/unload ramp resistance is unpredictable. Further, because the height at which the read/write heads fly over the magnetic disk is non-linearly related to the speed of rotation of the magnetic disk, the position of the read/write heads on the load/unload ramp vary. This causes problems when loading heads onto the magnetic disk.

Another concern is that the read/write heads are not always reliably unloaded. This occurs because the amount of energy applied to the read/write heads is typically not regulated or controlled. For example, when relying upon a back EMF, where a spindle motor has a great deal of internal resistance, the spindle motor may spin-down faster than designed to do resulting in a back EMF energy that is lower than predicted. As a result of the lower back EMF energy, the read/write heads may not be reliably unloaded.

Upon power-up of a typical storage device, the read/write heads are typically moved from the safe position to a position above the data storage portion of the magnetic disk.

If the read/write heads are not carefully loaded onto the magnetic disk, the read/write heads may bounce on the magnetic disk again causing damage to the data storage portions of the magnetic disk resulting in data loss, misalignments to the read/write heads, damage to the read/write head elements, particulate generation and contamination, and other types of damage.

Concerns about present head loading methods include that the height at which the read/write heads fly over the surface of the magnetic disk is often unpredictable, thus when the heads are loaded, the heads may oscillate and touch the magnetic disk. As noted previously, because the position of the heads on the load/unload ramp vary at power-off, the speed of the magnetic disk at the moment the heads are loaded is unpredictable.

Thus what is required are methods and apparatus for providing more reliable loading and unloading of read/write heads in order to protect the read/write heads as well as the disk media.

SUMMARY OF THE INVENTION

According to the present invention, a technique including methods and a device for providing a single type of media for electronic storage applications is provided. In an exemplary embodiment, the present invention provides a methods and apparatus for unloading of MR heads from the surface of removable media.

According to an embodiment of the present invention, a method for unloading read/write heads from a surface of a magnetic disk, the magnetic disk coupled to a spindle motor includes the steps of using the spindle motor to rotate the magnetic disk at approximately a first number of revolutions per minute, positioning the read/write heads adjacent the surface of the magnetic disk, and receiving a head unload signal. The technique also includes the steps of using the spindle motor to rotate the magnetic disk at approximately a second number of revolutions per minute in response to the head unload signal, after a first predetermined amount of time after the step of receiving the head unload signal, biasing the read/write heads towards an outer edge of the magnetic disk, and after a second predetermined amount of time after the step of receiving the head unload signal, using the spindle motor to dynamically brake the magnetic disk from approximately the second number of revolutions per minute.

According to another embodiment, a method for repositioning read/write heads from a parking location to a position adjacent a surface of a magnetic disk, the magnetic disk coupled to a spindle motor, includes the steps of receiving a read/write heads load signal, and using the spindle motor to accelerate the magnetic disk typically from zero to approximately a first number of revolutions per time period, in response to the read/write heads load signal. The steps of biasing the read/write heads towards a position adjacent the surface of the magnetic disk, when the magnetic disk rotates at approximately the first number of revolutions per time period, and using the spindle motor to rotate the magnetic disk at approximately a second number of revolutions per time period, after the read/write heads are positioned adjacent the surface of the magnetic disk are also performed.

According to yet another embodiment of the present invention, a system having a storage device including read/write heads for repositioning the read/write heads from a parking location to a position adjacent a surface of a magnetic disk, the storage device includes a spindle motor coupled to the magnetic disk, for accelerating the magnetic disk to at least a first number of revolutions per time period while the read/write heads are positioned at the parking location, and a Voice Coil Motor (VCM driver) coupled to the read/write heads and to the spindle motor, for biasing the read/write heads towards the position adjacent the surface of the magnetic disk after the magnetic disk reaches the first number of revolutions per time period, wherein the spindle motor maintains a rotation of the magnetic disk at less than a second number of revolutions per time period while the read/write heads are positioned adjacent the surface of the magnetic disk, and wherein the spindle motor rotates the magnetic disk at a third number of revolutions per time period after the read/write heads are positioned adjacent the surface of the magnetic disk.

The present invention provides a more reliable method for providing the described functions. Depending upon the embodiment, the present invention provides at least one of these if not all of these benefits and others, which are further described throughout the present specification.

Further understanding of the nature and advantages of the invention may be realized by reference to the remaining portions of the specification and drawings.

DESCRIPTION OF SPECIFIC EMBODIMENTS

System Overview

Figure 1:
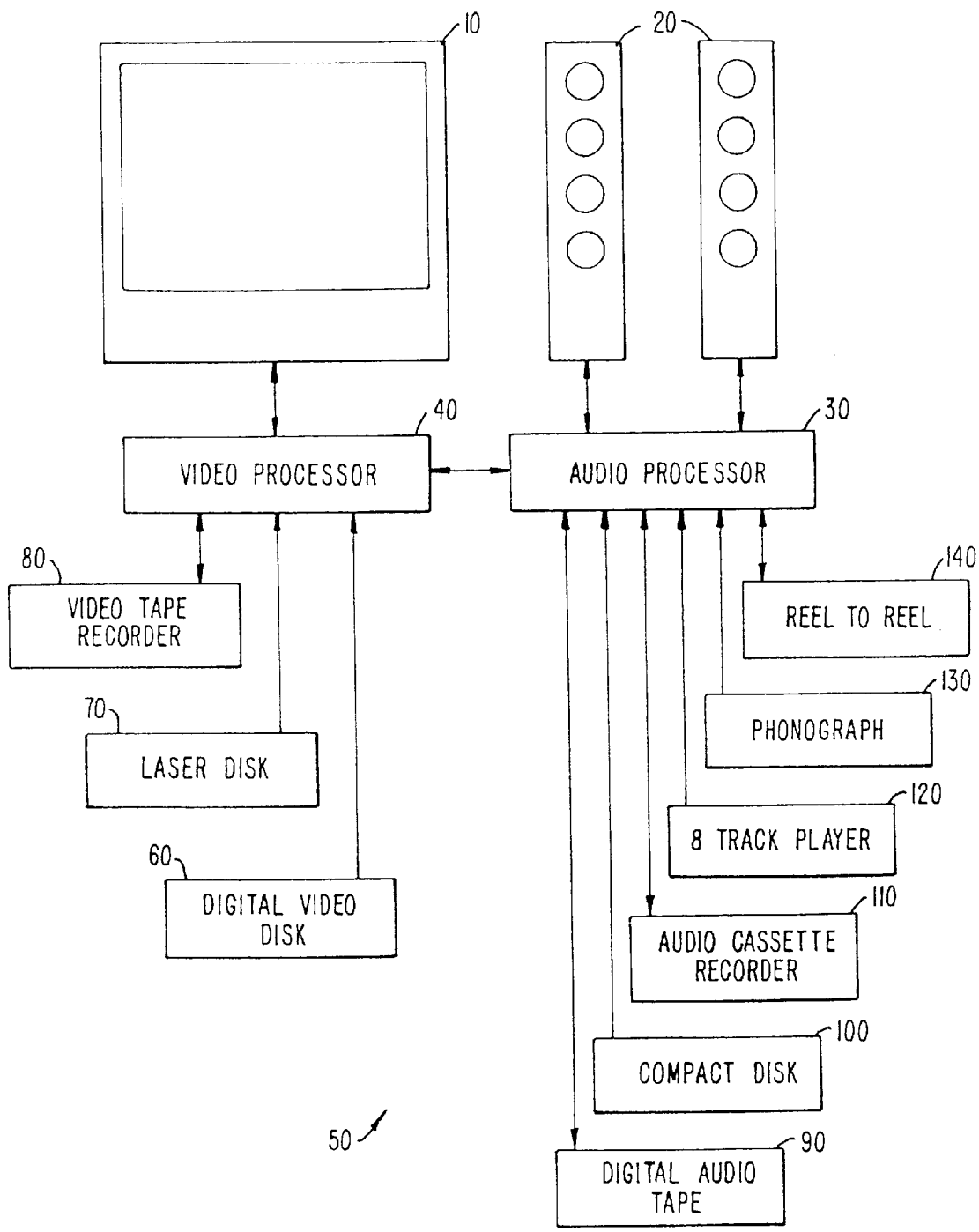
FIG. 1 illustrates a conventional audio and video configuration.
Figure 2:
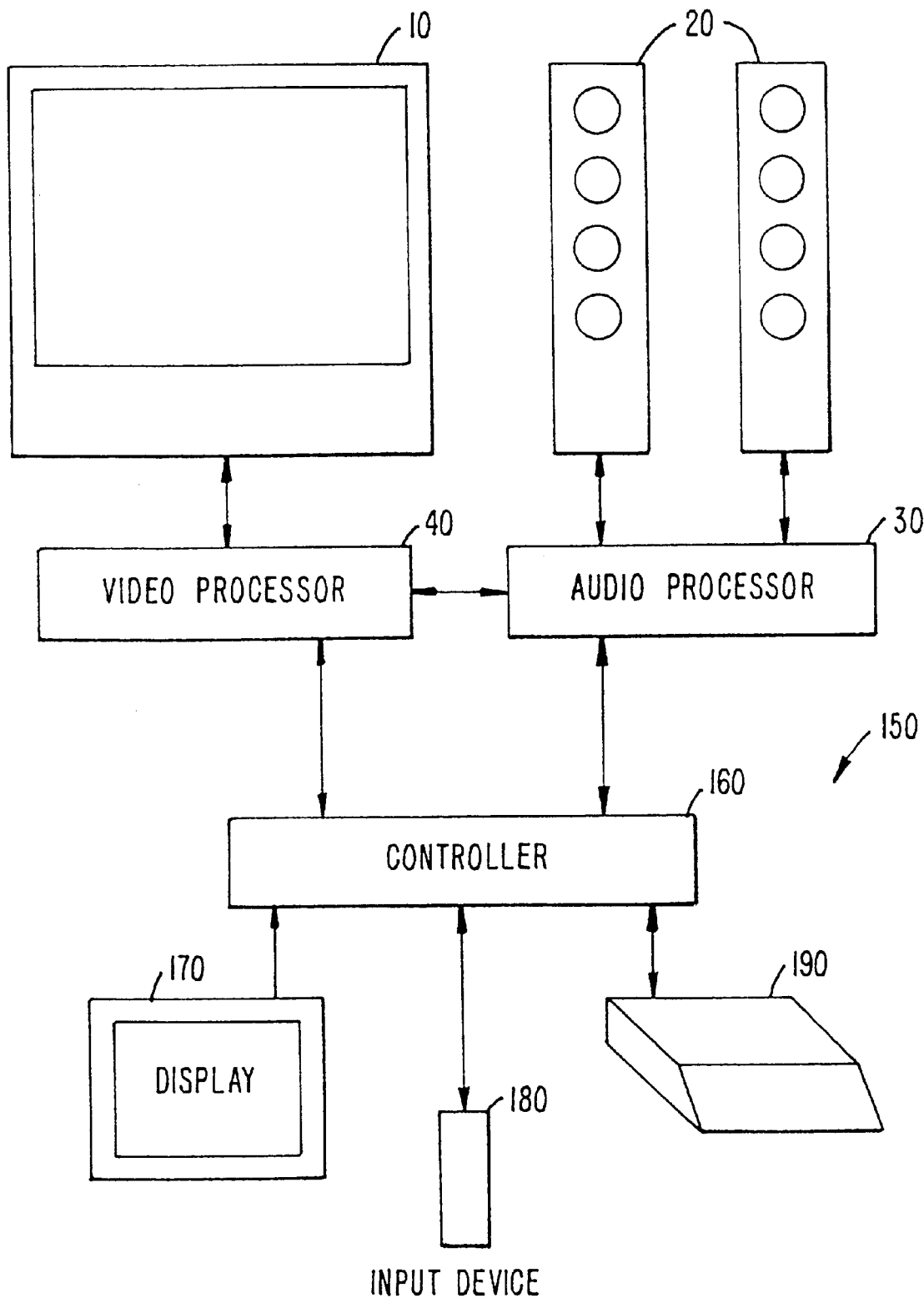
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
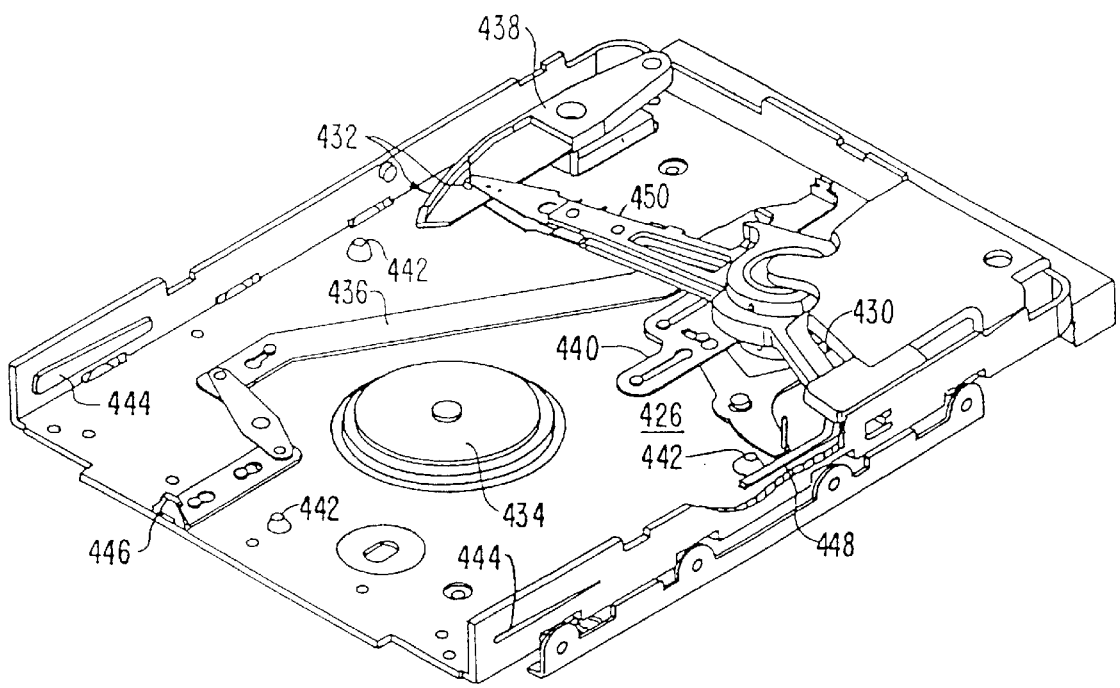
FIGS. 5A–5F illustrate simplified views and a storage unit for reading and/or writing from a removable media cartridge.
Figure 5B:
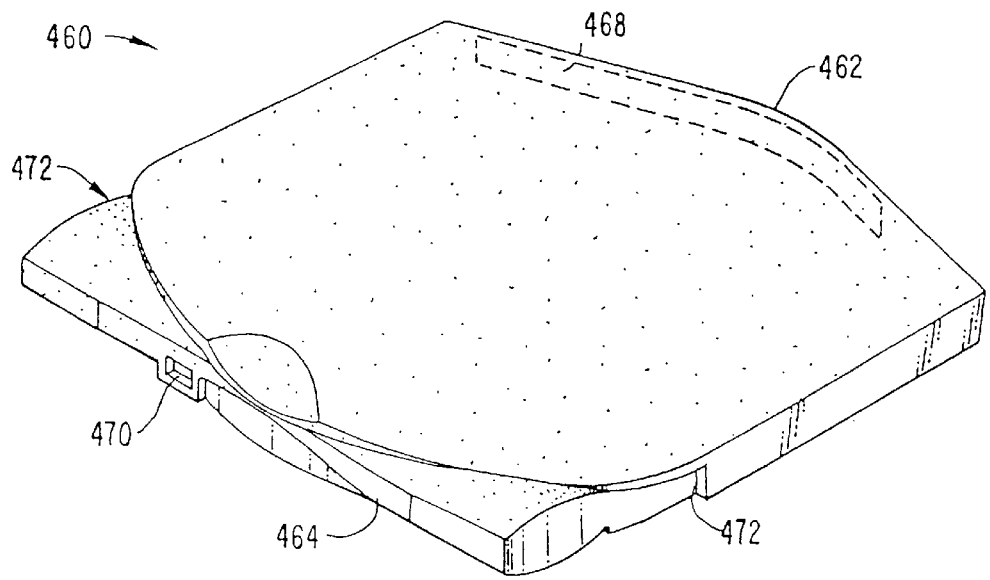
Figure 5C:
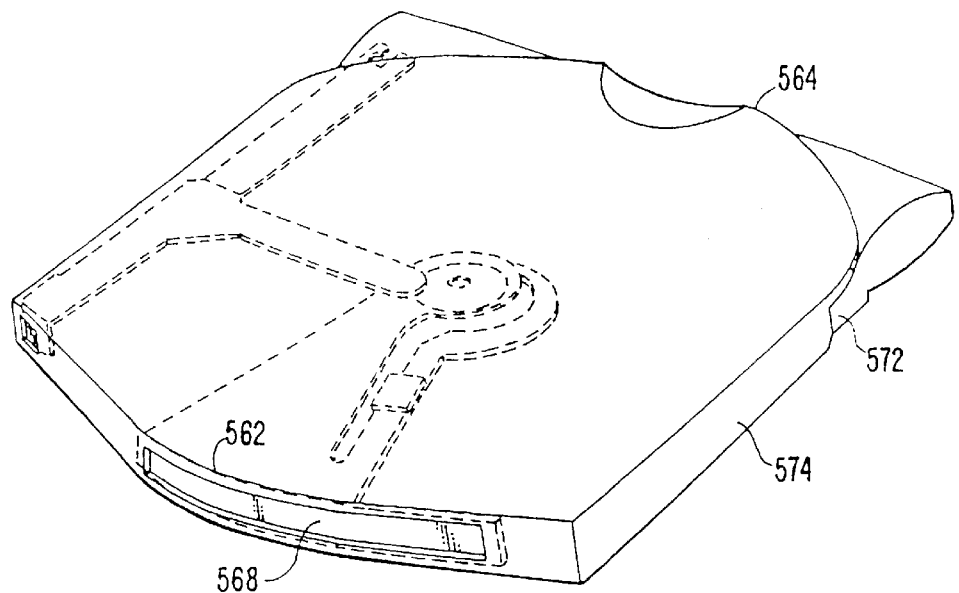

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII—2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
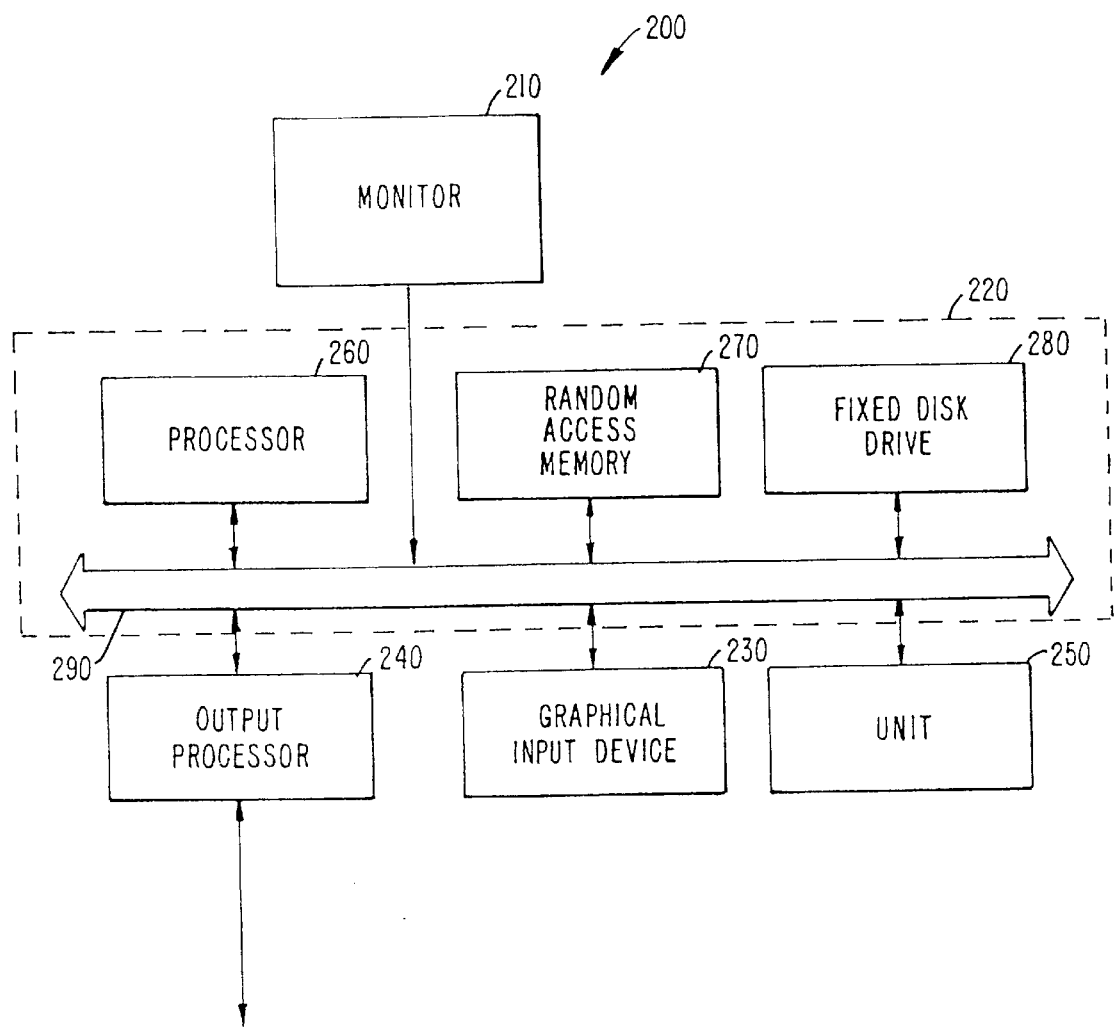
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows95™ operating system from Microsoft Corporation of Redmond, Wash. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

Detailed Description

Figure 4A:
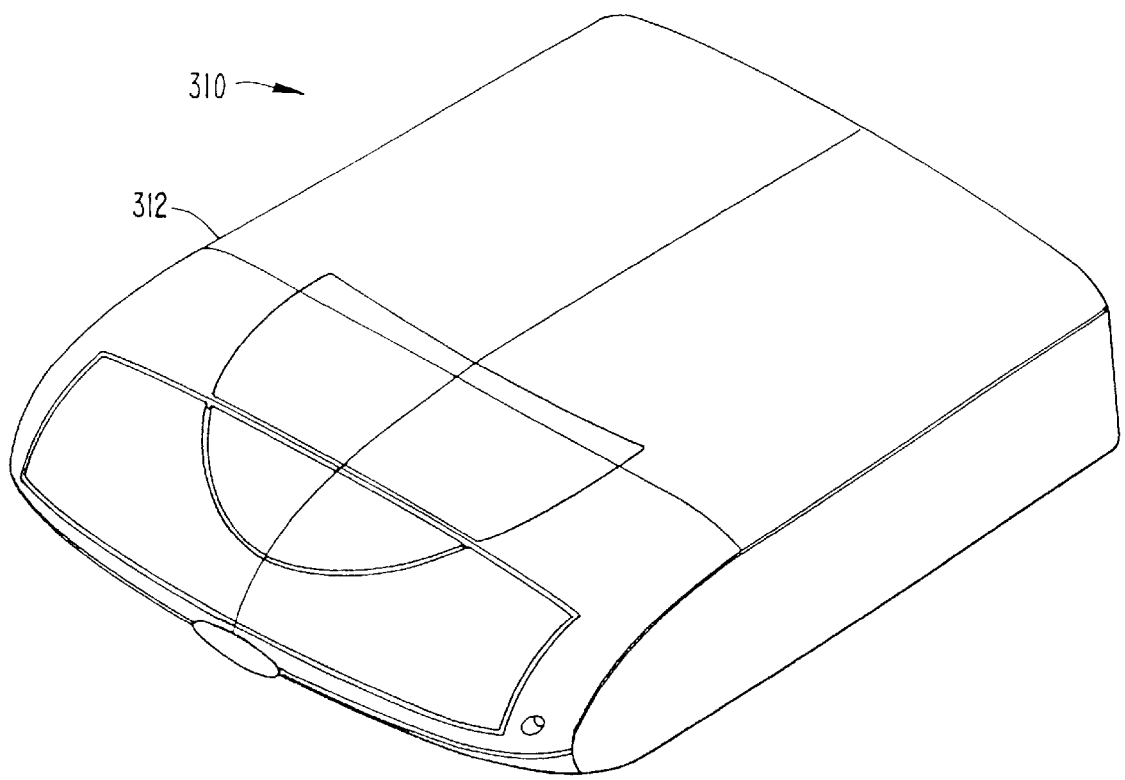
FIGS. 4A and 4B illustrate a storage unit according to an embodiment of the present invention.
Figure 4B:
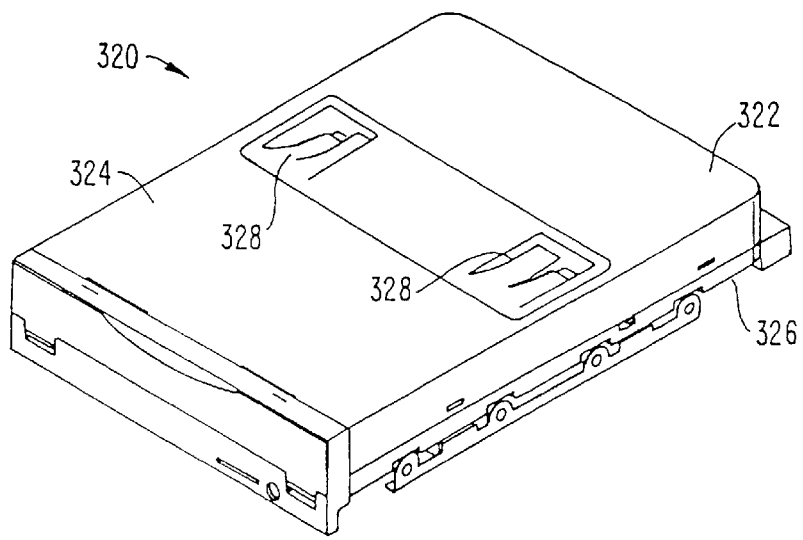

Referring now to FIGS. 4A and 4B, a storage unit according to the present embodiment can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A. In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
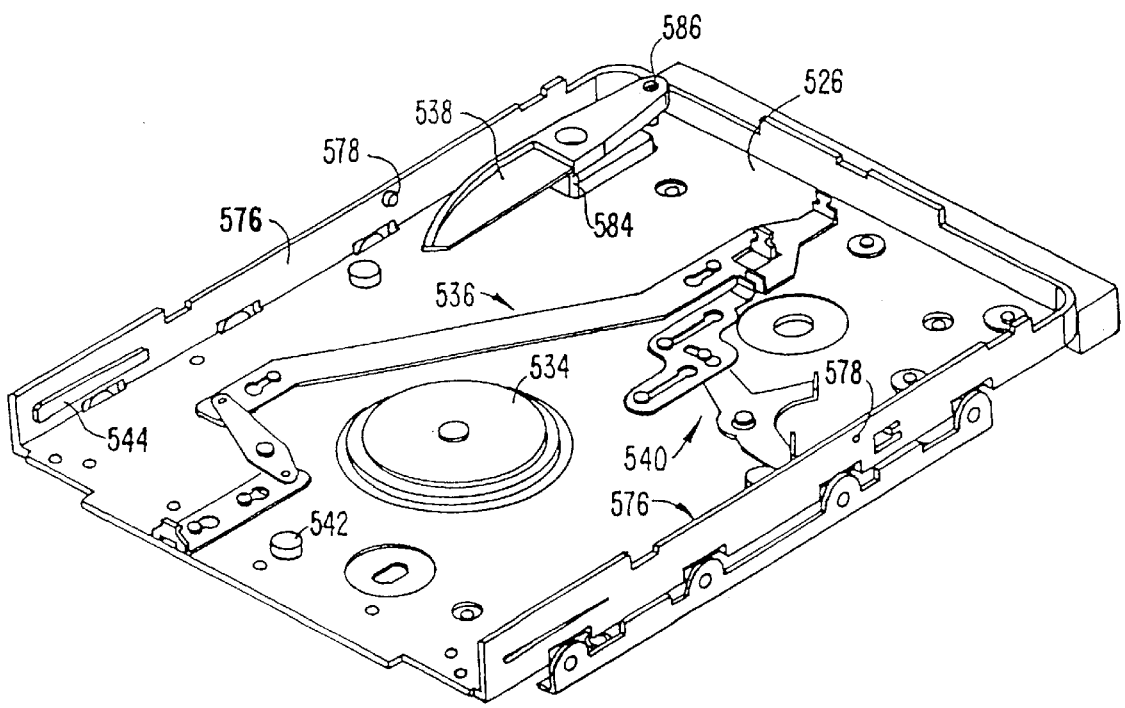
Figure 5E:
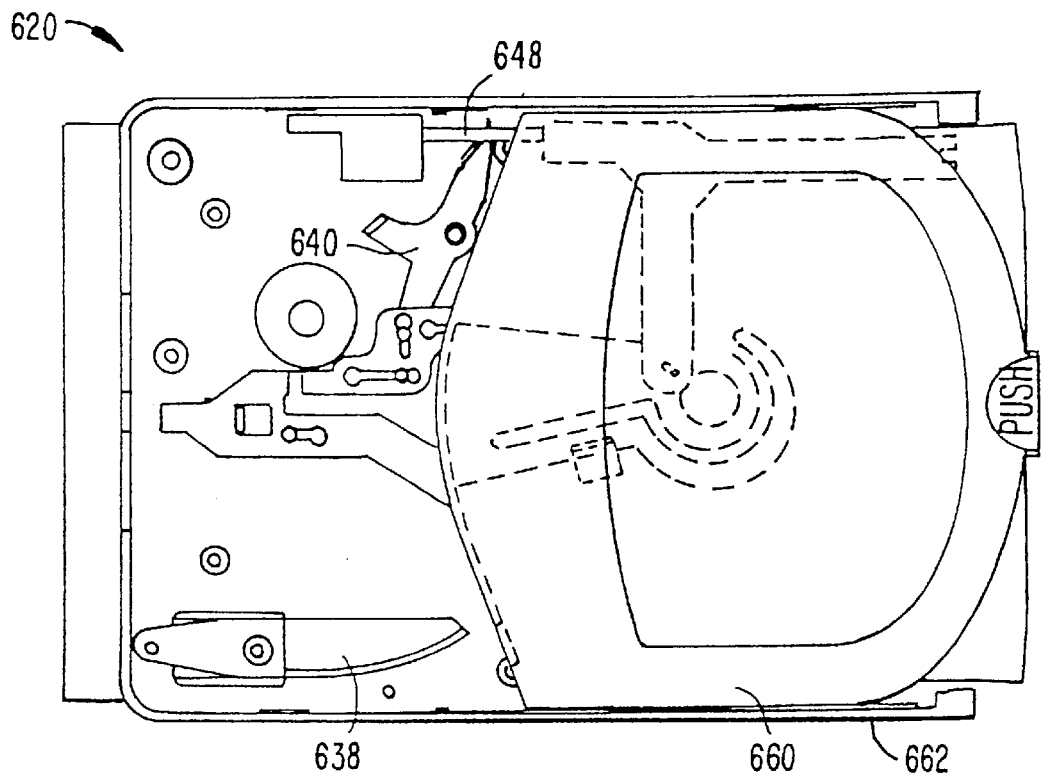

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
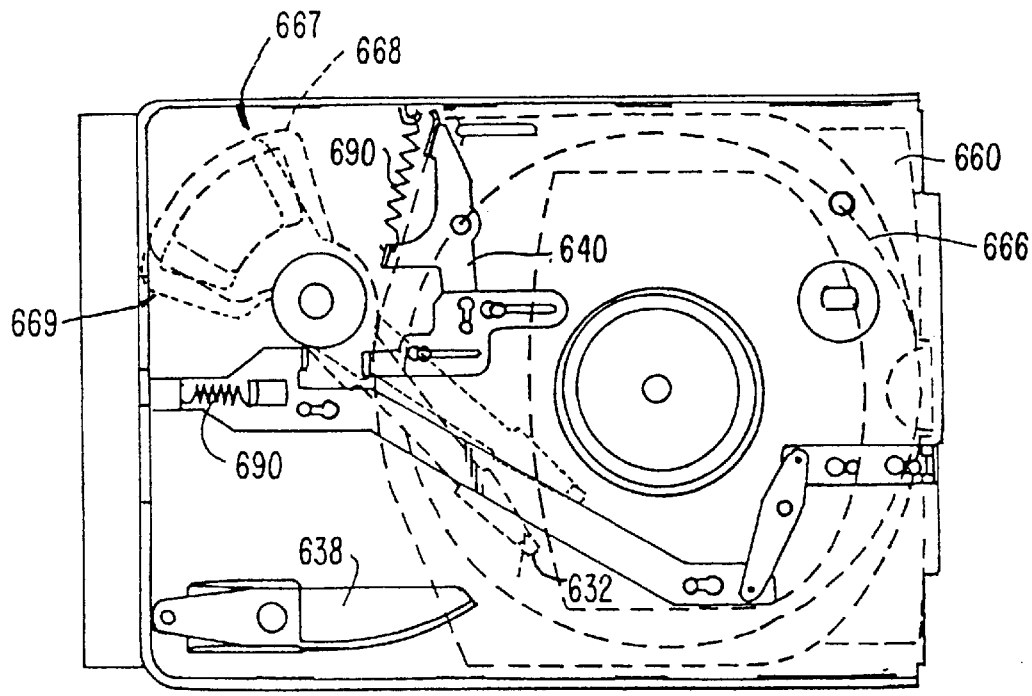

FIG. 5F also illustrates a typical first position 667 of VCM 668 and a typical second position 669 in response to different current pulses applied by a motor driver. As a result, read/write heads 632 are repositioned relative to disk 666 as shown.

Figure 6:
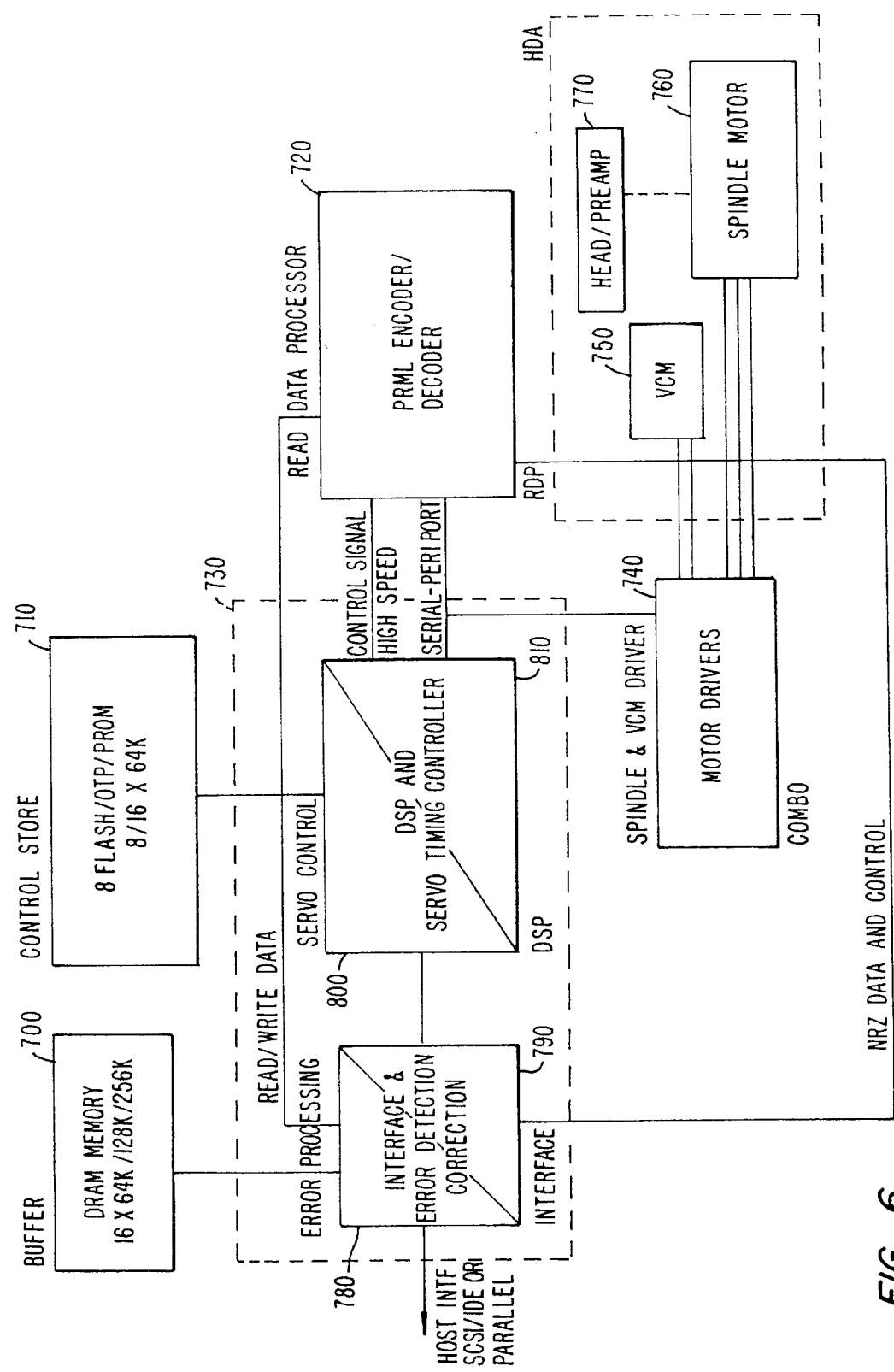
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to current pulses applied by voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits×64K, 128K, or 256K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises a 8 to 16 bit×64K memory array, preferably a flash RAM by Atmel. Control store 710 is coupled to DSP 800 and servo timing controller 810, and typically serves to store programs and other instructions, as well as data for DSP 800 and servo timing controller 810. Preferably, control store 710 stores access information that enables retrial of the above information from the media and calibration data.

Read data processor 720 typically comprises a Partial Read/Maximum Likelihood (PRML) encoder/decoder. PRML read channel technology is well known, and read data processor 720 is typically embodied as a 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AIC-8381B chip from Adaptec, Incorporated. Interface module 780 is coupled to error detection and correction module 790 for transferring data to and from the host system.

Error detection and correction module 790 is typically embodied as a AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as a AIC-4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP 800.

Motor driver 740 (or Voice Coil Motor driver) is typically embodied as a L6260L Chip from SGS-Thomson. Motor driver 740 provides signals to voice coil motor 750 and to spindle motor 760 in order to control the reading and writing of data to the removable media.

Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic field. VCM 750 also includes an actuator having a voice coil (a solenoid), and read/write heads. Read/write heads are typically positioned near the end of the actuator arm, as illustrated in FIG. 5A. The voice coil is typically electrically coupled to motor driver 740. VCM 750 is positioned relative to the magnetic disk in response to the amount of electric current flowing through the voice coil. FIG. 5F illustrates a typical first position 667 of VCM 668 and a typical second position 669 in response to different electric current from motor driver 740. As a result, read/write heads 632 are repositioned relative to disk 666 as shown.

In a preferred embodiment of the present invention read/write heads are separate heads that utilize magneto resistive technology. In particular, the MR read/write heads. Typically a preamplifier circuit is coupled to the read/write heads.

Figure 7:
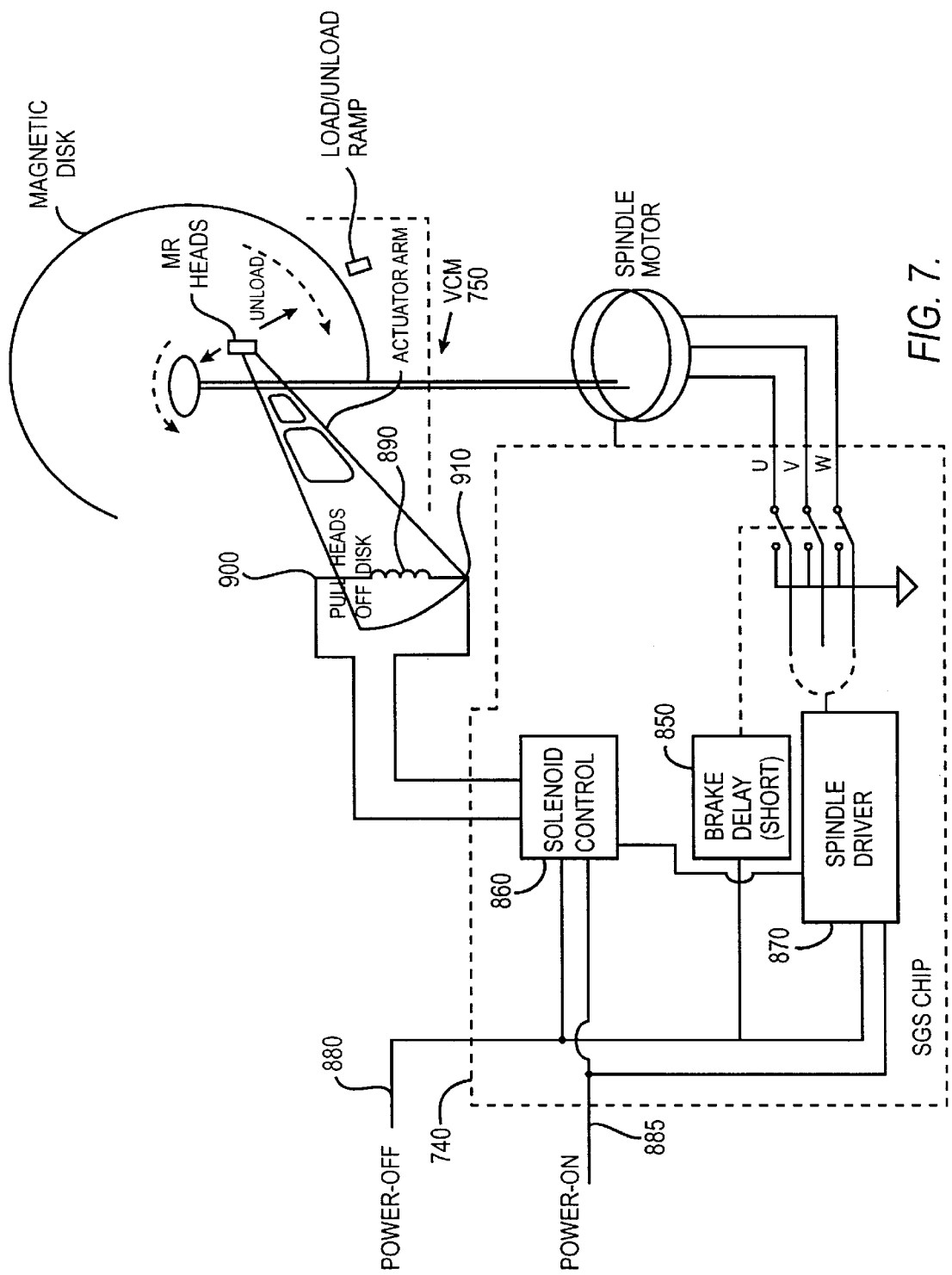
FIG. 7 illustrates a functional block diagram of a circuit for unloading read/write heads from the magnetic disk and onto a loading/unloading ramp.

In the preferred embodiment of the present embodiment the removable media cartridge is comprises as a removable magnetic disk. When reading or writing data upon the magnetic disk the read/write heads on the end of the actuator arm "fly" above the surface of the magnetic disk. Specifically, because the magnetic disk rotates at a high rate of speed, typically 5400 rpm, a negative pressure pulls the read/write heads towards the magnetic disk, until the read/write heads are typically 0.001 millimeters above the magnetic disk. FIG. 7 illustrates a functional block diagram of a embodiment of the present invention. FIG. 7 includes a more detailed block diagram of motor driver 740 above, including a solenoid control 860, and a spindle driver 870 each responsive to a power-on signal 885.

The solenoid 890 represents the voice coil described as part of the VCM 750 above and includes terminals 900 and 910. In one embodiment, solenoid control 860 is the primary control mechanism for positioning of MR heads anywhere above the magnetic disk. In alternative embodiments, solenoid 890 may be coupled to a separate power-on solenoid control by the same or different terminals for conventional power-on operation of solenoid 890 and the actuator arm.

In FIG. 7, the spindle driver 870 provides the drive voltage to the spindle motor to rotate the magnetic disk. During conventional data storage or retrieval, the drive voltage having a drive period is provided to spindle motor and is relatively constant such that the magnetic disk spins at approximately the same number of revolutions per time unit (per second, per minute, and the like).

In response to an active power-off signal 880, the spindle driver 870 modifies the voltage and the period of time it is applied to the spindle motor to thereby modify the rotation speed of the magnetic disk from a first number of revolutions per minute to a second number of revolutions per minute. In one embodiment, power-off signal 880 signal is asserted (active high) upon a power-off condition and is de-asserted (active low) otherwise. In alternative embodiments, the polarities are reversed.

In response to the active power-off signal 880, after a first delay, solenoid control 860 within VCM driver 740 applies controlled current pulses to solenoid 890 in VCM 750, as will be described below. In response to the controlled current pulses, MR heads are smoothly removed from the magnetic disk and preferably unloaded onto a load/unload ramp.

In other embodiments, solenoid control 860 monitors the speed of the spindle motor after the active power-off signal 880, and when the speed of the spindle motor has reached the second number of revolutions per minute, solenoid control 860 applies the controlled pulses to solenoid 890.

After a second delay, spindle driver 870 reduces the rotation speed of the magnetic disk to an idle rotation speed, typically a full stop. Dynamic braking/driver block 850 provides additional dynamic braking of the magnetic disk if desired.

In response to an active power-on signal 885, the spindle driver 870 asserts a drive voltage having a drive period so as to increase the rotation speed of the magnetic disk to at least a first number of revolutions per second. In one embodiment, power-on signal 885 signal is asserted (active high) upon a power-on condition and is de-asserted (active low) otherwise. In alternative embodiments, the polarities are reversed.

In response to the active power-on signal 885, after a first delay, solenoid control 860 within VCM driver 760 applies controlled current pulses to solenoid 890, within VCM 750, as will be described below. In response to the controlled current pulses, MR heads are smoothly unloaded onto the magnetic disk.

In other embodiments, solenoid control 860 is coupled to the spindle motor and monitors the speed of the spindle motor, and, as will be discussed below, when the speed of the spindle motor has stabilized at the first number of revolutions per second, solenoid control 860 applies the controlled current pulses to solenoid 890.

After a second delay, spindle driver 870 increases the rotation speed of the magnetic disk to a second number of revolutions per second, typically an operating speed.

In the embodiment in FIG. 7, dynamic braking/driver block 850, solenoid control 860, spindle driver 870, and other functional components are embodied within voice coil motor driver 740. In one embodiment, voice coil motor driver 740 is an L6260L chip from SGS-Thomson. Other motor driver chips from other vendors are also usable in alternative embodiments of the present invention.

Figure 8:
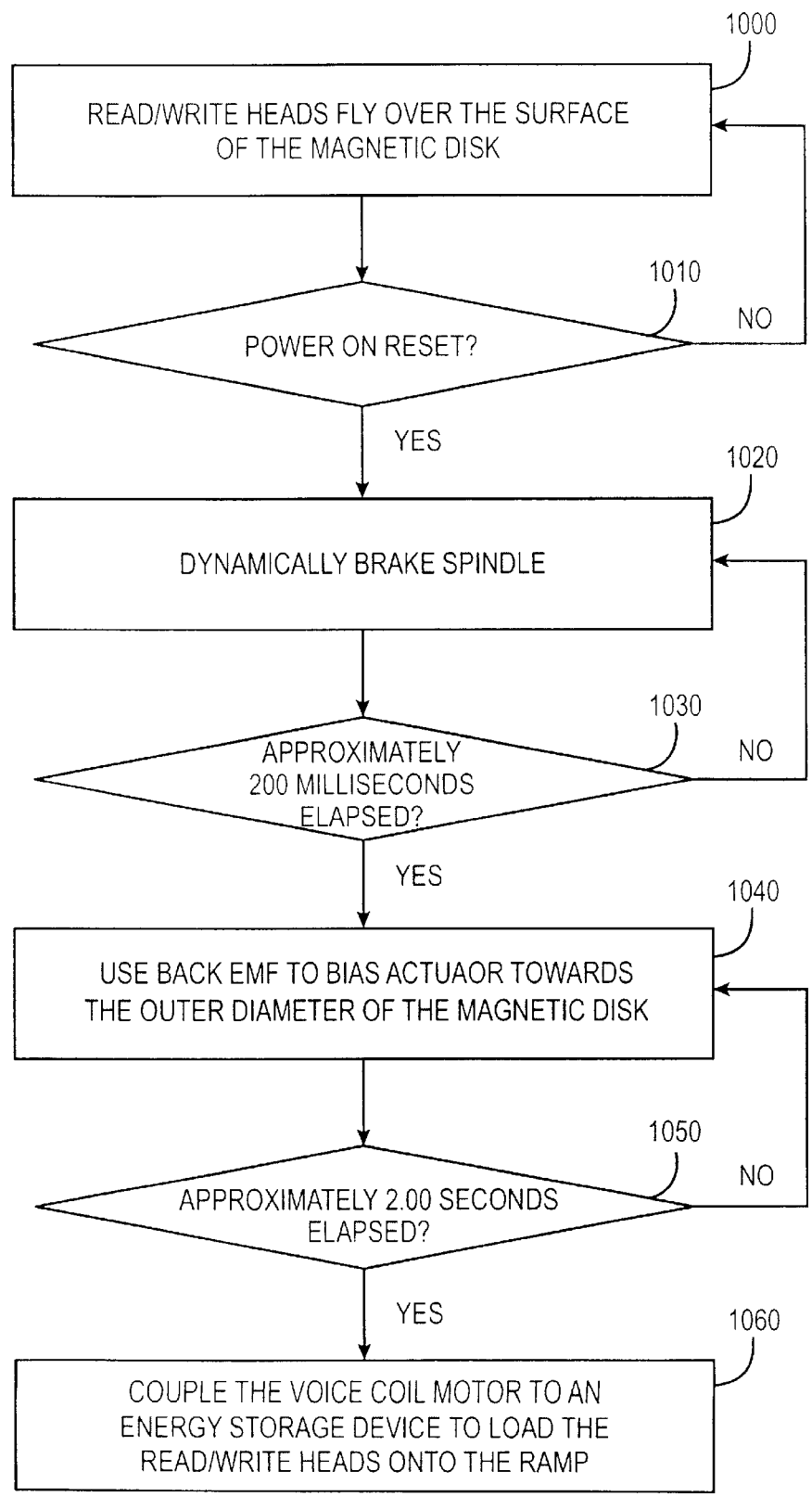
FIG. 8 illustrates a block, diagram of a method for unloading heads according to an embodiment of the present invention.

FIG. 8 illustrates a block diagram of a method for unloading heads according to an embodiment of the present invention.

Initially, the read/write (MR) heads fly above the magnetic disk at a first number of revolutions per minute (rpm or other time unit), step 1000. In the present embodiment, this first number is approximately 5400 rpm. This speed is typically the rotation speed where the MR heads read from or write to the magnetic disk. In other embodiments this speed may be different, for example 7200 rpm.

Next, upon detection of a power-off signal 880, step 1010, spindle driver 870 applies a voltage of a certain period of time to spindle motor 760 such that the speed of the spindle motor 760 is adjusted from the first number of rpms until a second number of rpms (a parking speed) is reached, step 1020. The rate of change may be linear, or otherwise. In the present embodiment, this second number is typically smaller than the first number. For example, when the first number is approximately 5400 rpm, the second number may be approximately 700 rpm.

In alternative embodiments, the second number may be larger than the first number. For example, when the first number is approximately 5400 rpm, the second number may be above approximately 7000 rpm.

In one embodiment of the present invention, determining when the second number of rpms has been reached is performed directly by monitoring the speed of the spindle motor 760.

In another embodiment, the rate of acceleration or deceleration of the spindle motor is known ahead of time. Thus, the amount of time it takes the spindle motor to speed up from 5400 rpm to 7000 rpm or other speed in response to a drive voltage can be accurately estimated. Similarly, the amount of time it takes the spindle motor to slow down from 5400 rpm to 700 rpm or any other speed in response to a drive voltage can also be accurately estimated. Thus, in one embodiment of the present invention, it is assumed the second number of rpms has been reached in step 1030 after a first period of time after step 1020.

After the second number of rpms has been reached, step 1030, solenoid control 860 applies a stream of current pulses to solenoid 890 in VCM 750 such that the MR heads are moved at a constant velocity on the magnetic disk, step 1040. A typical velocity is approximately 3 inches/second. This step preferably also unloads the MR head onto the load/unload ramp, or moves the MR head to a landing region. The method of moving the MR head can be performed using the invention described in pending application Ser. No. 09/082,425, entitled MR Head Unload Technique, assigned to the same assignee, incorporated by reference for all purposes.

In one embodiment, the second number of rpms is referred to as the parking speed, and when the parking speed is reached, the spindle motor maintains the number of rpms at approximately the parking speed. In another embodiment, after the parking speed is reached, the spindle motor continues to decelerate at its own pace. In another embodiment, after the parking speed is reached, the spindle motor continues to decelerate at its own pace, but is prevented from dropping below a predetermined floor speed while the MR heads are being unloaded. For example, if the parking speed is 700 rpm, while the MR head is being unloaded, the spindle motor is allowed to continually slow down but is not allowed to drop below a floor speed of 500 rpm.

In one embodiment of the present invention, determining when the MR heads are unloaded onto the head load/unload ramp is performed directly by monitoring the back EMF voltage of solenoid 890 in the VCM 750. In another embodiment, the MR heads are considered unloaded a predetermined amount of time after no more data is read from the MR heads.

In yet another embodiment of the present invention, it is assumed the MR heads have been unloaded after a second period of time after solenoid control 860 applies a current pulse to solenoid 890 in step 1040. In such an embodiment, the rate of movement of the MR heads is known ahead of time, thus, the amount of time it takes the MR heads to move from any position on the magnetic disk to the load/unload ramp can be accurately estimated. In another embodiment, when the current pulses applied to VCM 750 are very large, it can be assumed that the MR heads have stopped moving on the load/unload ramp, or have hit a stop on the load/unload ramp.

After the MR head has been unloaded, step 1050, the speed of the spindle motor can be slowed to a complete stop, step 1060. In the present invention, dynamic braking can also occur in this step.

Figure 9A:
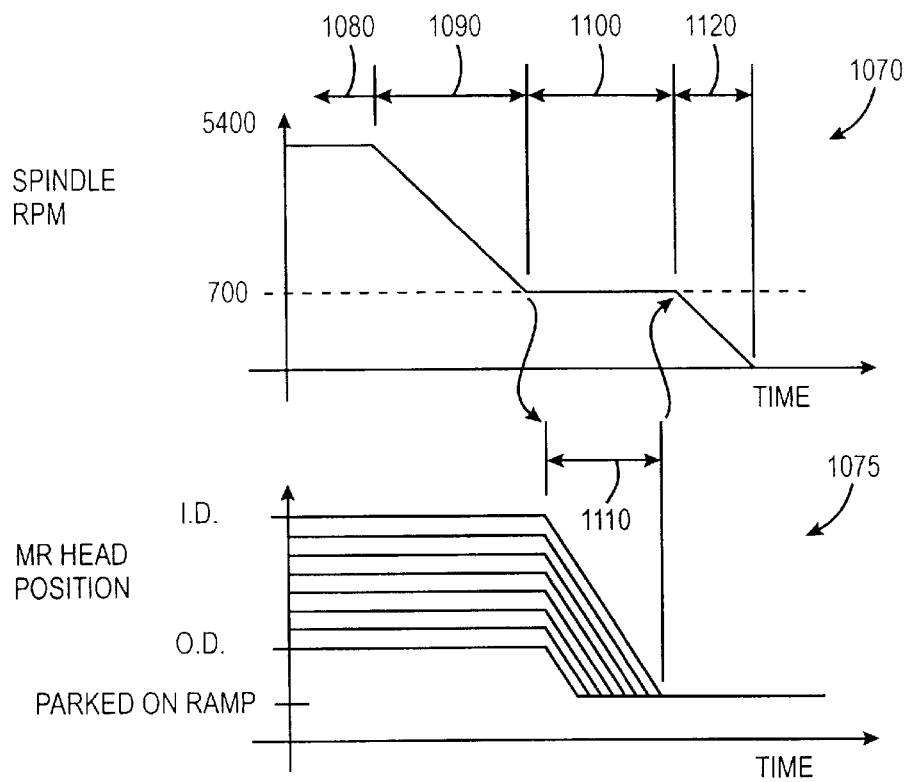
FIGS. 9a and 9b illustrate typical time profiles of embodiments of the present invention.
Figure 9B:
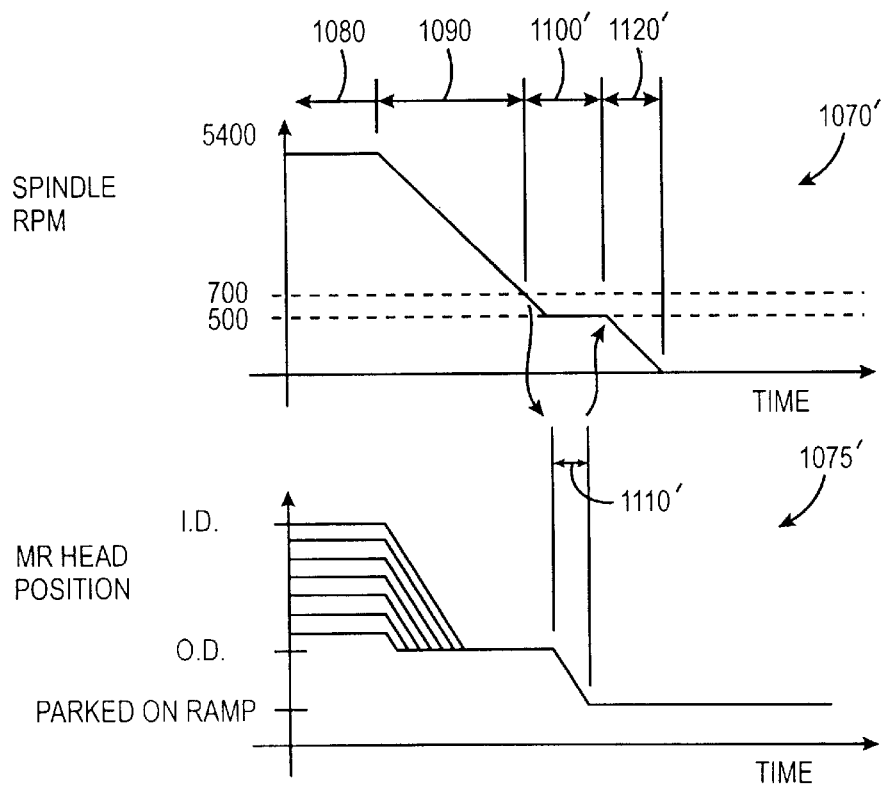

FIGS. 9a and 9b illustrate typical time profiles of embodiments of the present invention. In FIG. 9a, profile 1070 illustrates the profile of the speed of the magnetic disk in revolutions per minute versus time. Profile 1075 illustrates the position of the MR head versus time using the same time base as profile 1070. Time periods 1080–1120 are also illustrated.

Time period 1080 represents a typical operating condition of the present invention. During time period 1080, the magnetic disk operates at an operating speed, (for example 5400 rpm) and the MR head is located above a data storage portion of the magnetic disk. Next, a signal such as an eject disk signal, a power-off signal, and the like occurs, and during time period 1090, the magnetic disk is slowed to a parking speed of 700 rpm. The magnetic disk is then kept spinning at 700 rpm for time period 1100. As disclosed above, in other embodiments of the present invention, the parking speed may vary, further the parking speed may be greater than the first number of rpms.

After the magnetic disk stabilizes at 700 rpm, the MR head is moved from above the magnetic disk and unloaded onto a load/unload ramp during time period 1110. In the present embodiment, the MR head is controlled to be moved at approximately a constant velocity, as shown, whether the MR head is located at the inner diameter (I.D.), the outer diameter (O.D.) of the magnetic disk, or in between.

In one embodiment described above, time period 1100 (a hold time) ends after it is detected that the MR heads are unloaded onto the load/unload ramp. In another embodiment, time period 1100 is an amount of time that is predetermined based upon the known characteristics of the MR head movement.

After the MR heads have been unloaded, the magnetic disk is slowed from approximately 700 rpm to an idle rpm (0 rpm) during time period 1120.

In the present embodiment, time period 1090 is on the order of 2–3 seconds, time period 1110 is on the order of less than 450 milliseconds. It is envisioned that the duration of the above time periods may vary by user design, depending upon the physical characteristics of the storage unit, and the like.

FIG. 9b, illustrates an embodiment where the parking speed varies within a range and where the MR heads are pre-positioned prior to being unloaded. In FIG. 9b, the MR heads are moved to the O.D. at the same time the disk is slowed during time period 1090, i.e., propositioned prior to being unloaded. Because the MR head is closer to the load/unload ramp, the unloading time 1110' is typically shorter and time period 1100' is also typically shorter.

As illustrated in FIG. 9b, the spindle speed can vary within a range of 700–500 rpm, in this example, while the MR head is being unloaded. Because the spindle speed can slow down while unloading the MR head, the time period 1120 can also be shorter.

Figure 10:
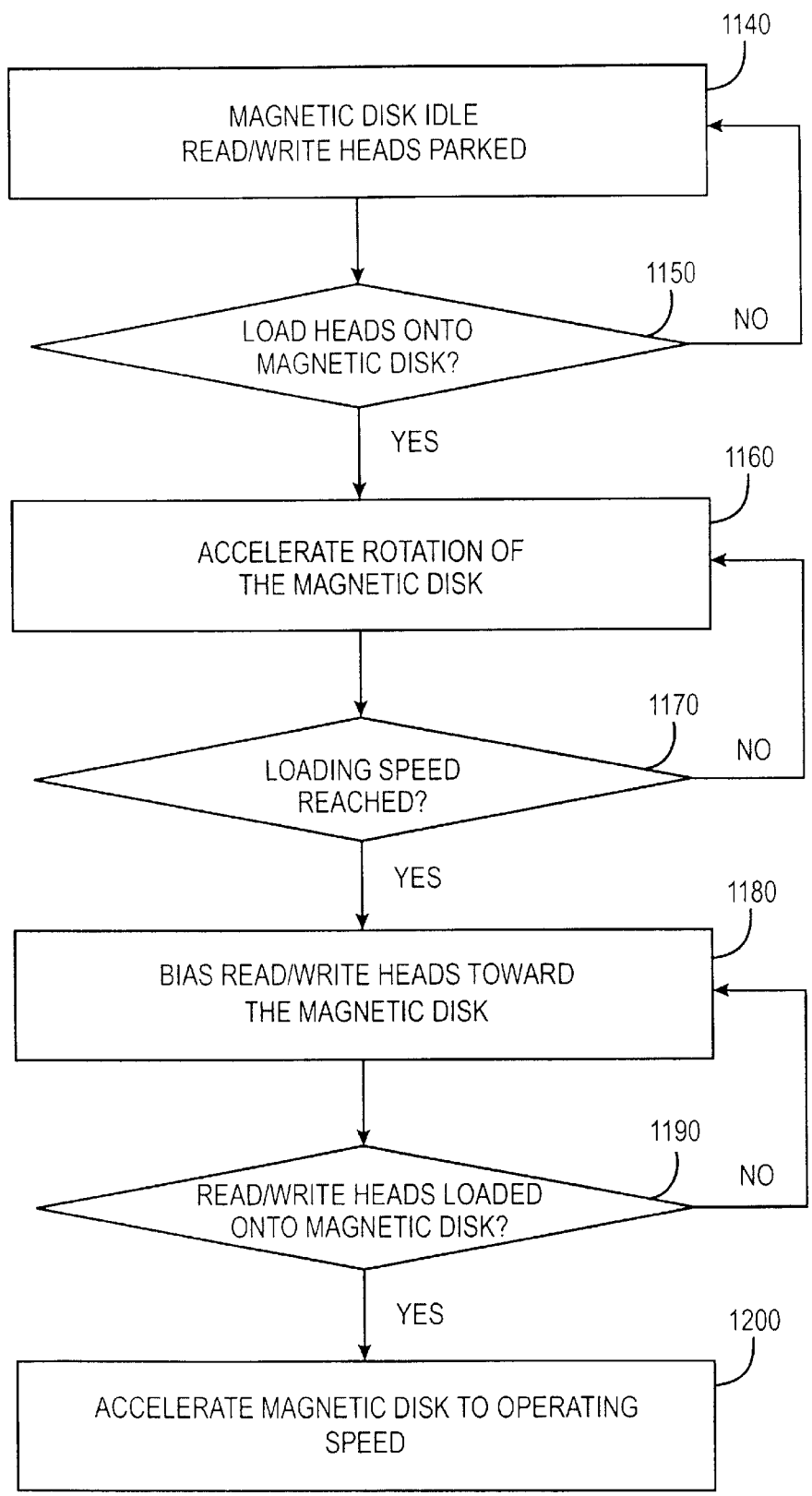
FIG. 10 illustrates a block diagram of a method for unloading heads according to an embodiment of the present invention.

FIG. 10 illustrates a block diagram of a method for loading heads according to an embodiment of the present invention.

Initially, the read/write (MR) heads are parked on the load/unload ramp and the magnetic disk is idle, step 1140.

Next, upon detection of a power-on signal 885, step 1150, spindle driver 870 applies a voltage of a certain time period to spindle motor 760 so that the speed of the spindle motor is accelerated to at least a first number of rpms (a loading speed), step 1160. In one embodiment this first number is approximately 1000 rpm, in another embodiment the first number is approximately 7200 rpm, and the like. The rate of change can be linear, and the like.

In one embodiment of the present invention, determining when the first number of rpms has been reached is performed directly by monitoring the speed of the spindle motor 760.

In another embodiment, the response of the spindle motor 760 to the voltage pulses is known ahead of time. Thus, the amount of time it takes the spindle motor 760 to speed up from idle to 1000 rpm or to 7200 rpm in response to a drive voltage can be accurately determined. Thus, in one embodiment of the present invention, it is assumed the first number of rpms has been reached in step 1170 a first period of time after spindle driver 870 applies a voltage in step 1160.

After the first number of rpms (the loading speed) has been reached, step 1170, solenoid control 860 applies current pulses to solenoid 890 in VCM 750 such that the MR heads are loaded onto the magnetic disk from the load/unload ramp, step 1180. A typical constant velocity is approximately 3 inches/second. The method of moving the MR head smoothly and with reduced audible noise can be performed by the invention described in application Ser. No. 09/082,425, described above.

In one embodiment, when the loading speed is reached, the spindle motor maintains the number of rpms at approximately the loading speed. In another embodiment, after the loading speed is reached, the spindle motor continues to accelerate at its own pace. In another embodiment, after the loading speed is reached, the spindle motor continues to accelerate at its own pace, but is prevented from increasing above a predetermined ceiling speed while the MR heads are being loaded. For example, if the parking speed is approximately 1000 rpm, while the MR head is being loaded, the spindle motor speeds up but does rise above a ceiling speed of approximately 1500 rpm.

In one embodiment of the present invention, determining when the MR heads are unloaded onto the head load/unload ramp is performed directly by determining if the MR heads detect any data from the magnetic disk.

In yet another embodiment of the present invention, it is assumed the MR heads have been loaded after a second period of time after solenoid control 860 applies a voltage to solenoid in step 1160. In such an embodiment, the rate of movement of the MR heads is known ahead of time, thus, the amount of time it takes the MR heads to move from the load/unload ramp to the magnetic disk can be accurately estimated. In one embodiment, the amount of time is estimated to be for loading of the MR heads and repositioning the MR heads to approximately the middle of the magnetic disk.

After the MR head has been loaded, step 1190, the speed of the spindle motor is brought to a second number of rpms, an operating speed, step 1200. In one embodiment, the operating speed is approximately 5400 rpm, although other speeds are usable.

Figure 11A:
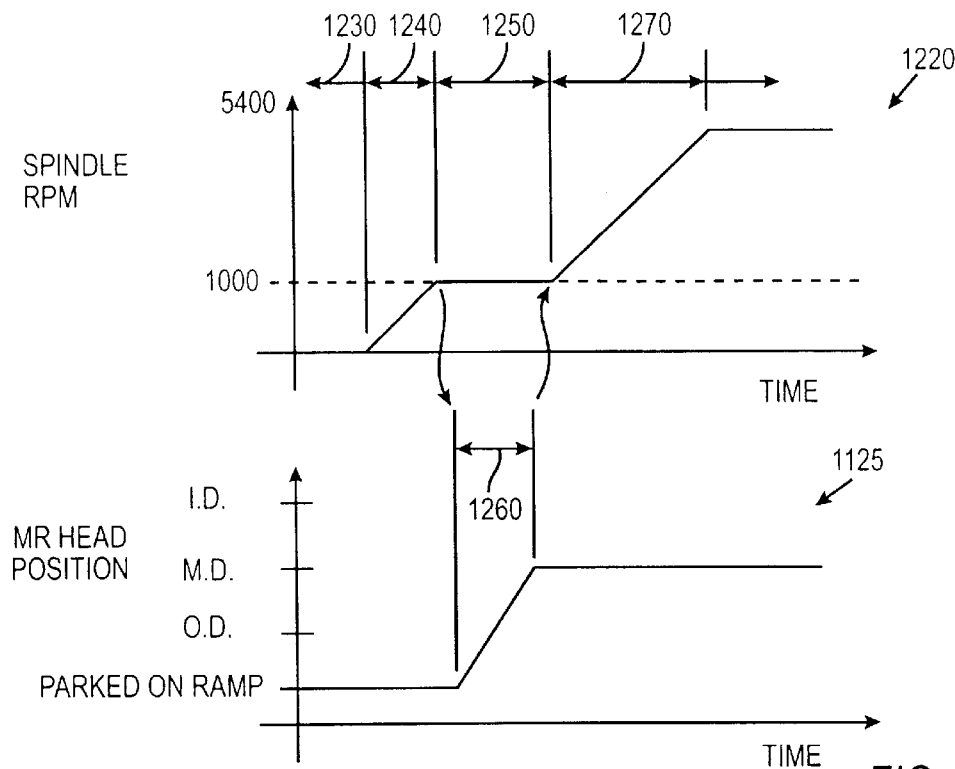
FIGS. 11a–b illustrate typical time profiles of embodiments of the present invention.
Figure 11B:
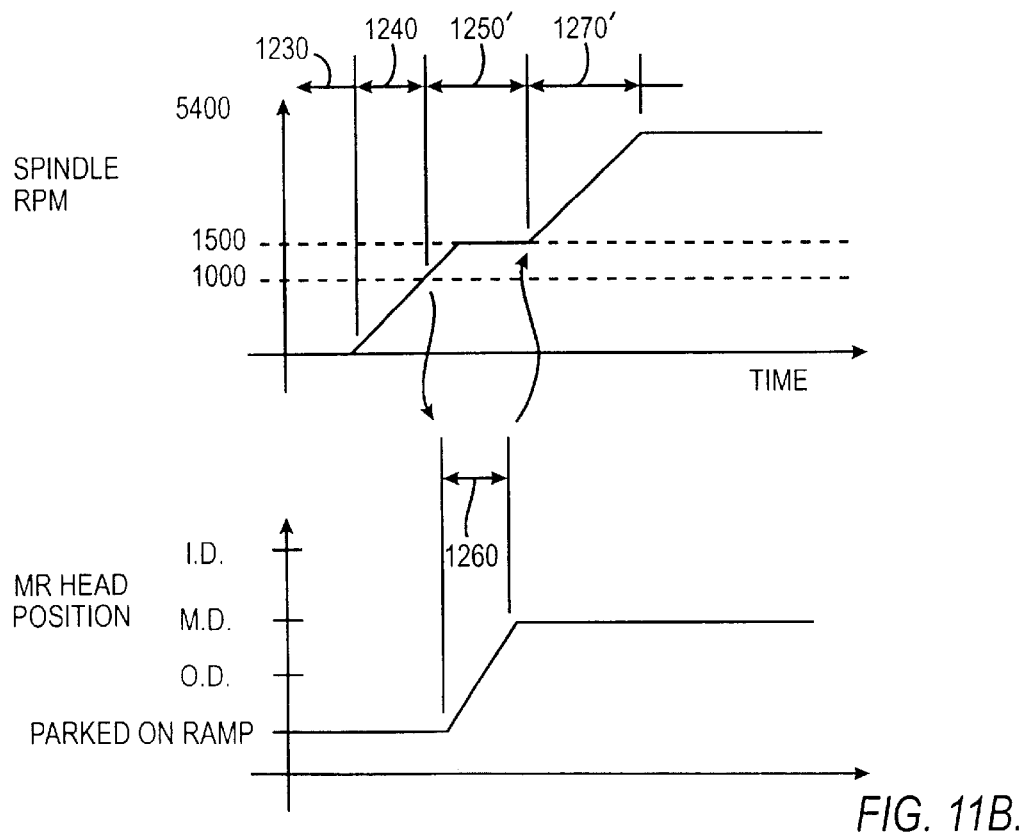

FIGS. 11*a* and 11*b* illustrate typical time profiles of embodiments of the present invention. In FIG. 11*a*, profile 1220 illustrates the profile of the speed of the magnetic disk in revolutions per minute versus time. Profile 1225 illustrates the position of the MR head versus time using the same time base as profile 1220. Time periods 1230–1270 are also illustrated.

Time period 1230 represents a typical rest condition of the present invention. During time period 1230, the magnetic disk is typically idle, and the MR head is located on a load/unload ramp. Next, a signal such as an disk insert signal, a power-on signal, and the like occurs, and during time period 1240, the magnetic disk is accelerated to approximately 1000 rpm. The magnetic disk is then kept spinning at approximately 1000 rpm for time period 1250. In other embodiments of the present invention, the number of rpms may vary and be larger than the operating number of rpms.

After the magnetic disk reaches at approximately 1000 rpm, the MR head is moved from the load/unload ramp loaded onto any position on the magnetic disk during time period 1260. In the present embodiment, the MR head is controlled to be moved at approximately a constant velocity as shown. As disclosed above, in one embodiment of the present invention, the time period 1250 is estimated and is longer than time period 1260.

After the MR heads have been loaded onto the magnetic disk, the magnetic disk is accelerated to the operating speed, such as 5400 rpm, during time period 1270.

In the present embodiment, time period 1240 is approximately 300 milliseconds, time period 1250 is approximately 450 milliseconds, and time period 1270 is approximately 3 seconds. It is envisioned that the duration of the above time periods may vary by user design, depending upon the physical characteristics of the storage unit, and the like.

FIG. 11*b*, illustrates an embodiment where the loading speed varies within a range. As illustrated, the spindle speed can vary within a range of 1000–1500 rpm, in this example, while the MR head is being loaded. Because the spindle can accelerate to the ceiling speed, the time period 1270' is typically shorter.

Conclusion

In the foregoing specification, the invention has been described with reference to specific exemplary embodiments thereof. Many modifications or changes are readily envisioned in alternative embodiments of the present invention, for example parking of the MR heads onto the load/unload ramp may include different parking speeds or reverse-forward parking, discussed below.

Figure 12A:
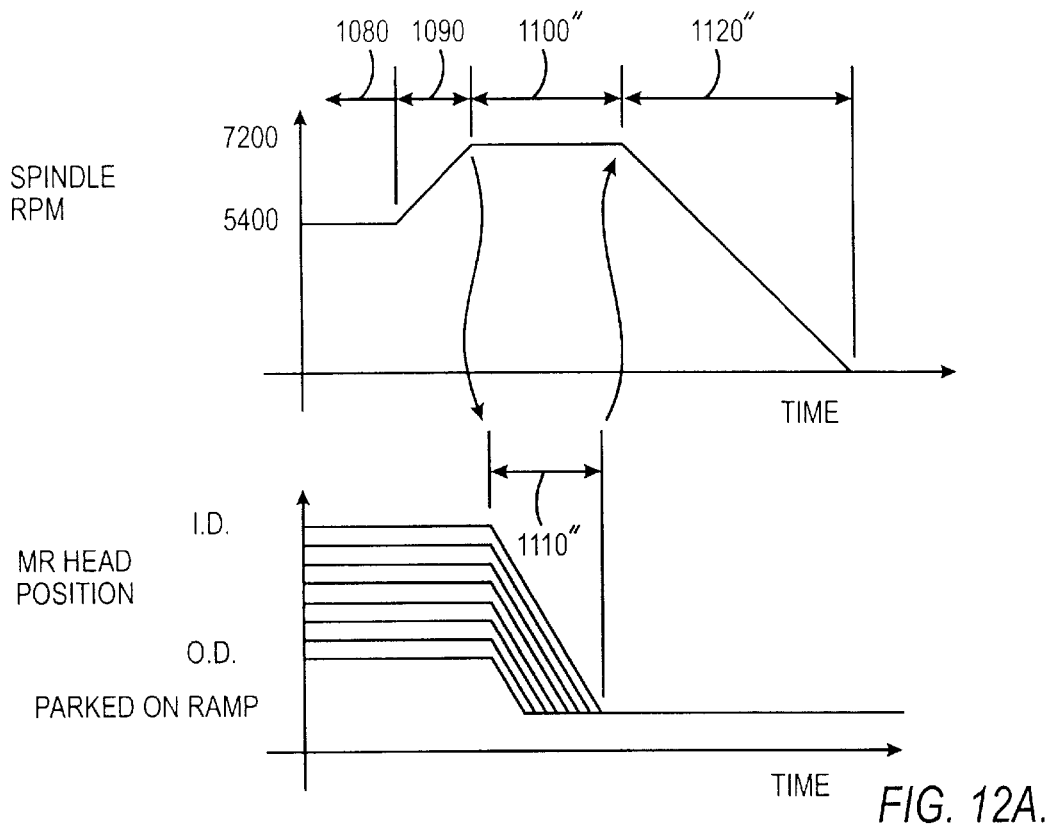
FIGS. 12a and 12b illustrate other time profiles of embodiments of the present invention.

FIG. 12*a* illustrates an embodiment where the parking speed (7200 rpm) is higher than the operating speed (5400 rpm). It has been determined that in some embodiments, having a higher parking speed provides a more consistent MR head height from the magnetic disk thus facilitating unloading.

Figure 12B:
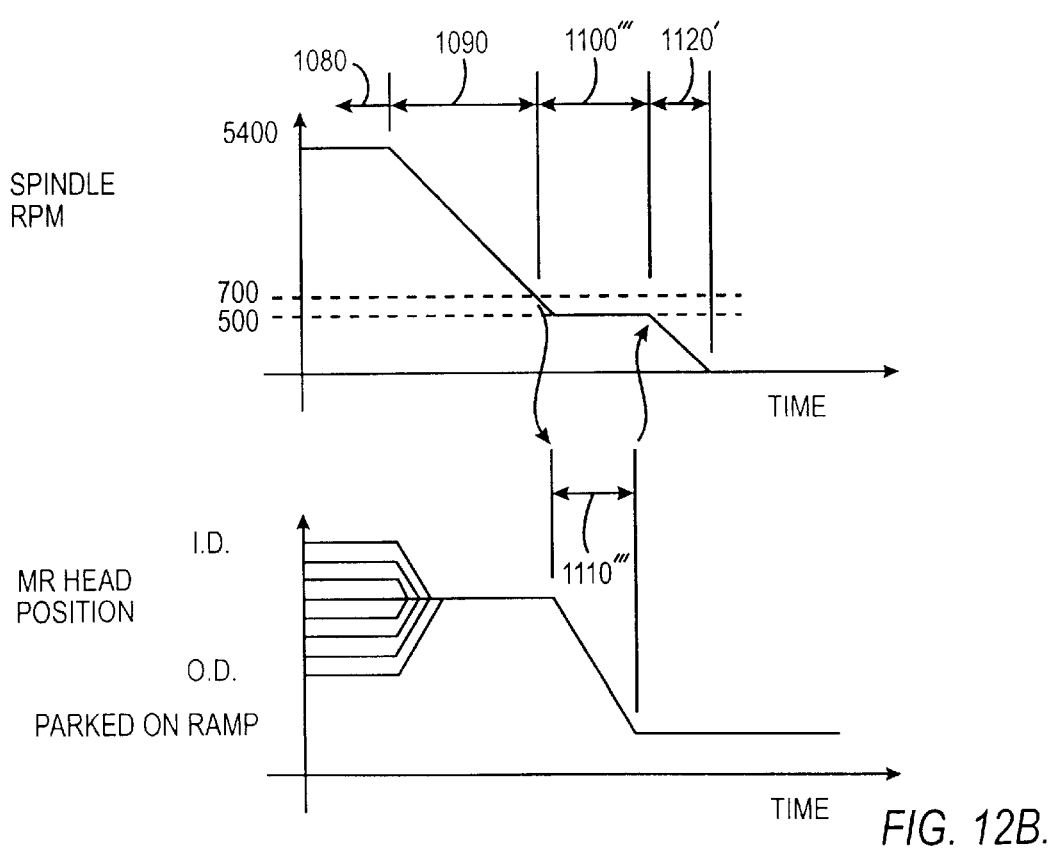

In the embodiment in FIG. 12*b*, the MR heads are moved to a position between the O.D. and the ID, the middle diameter (M.D.), at the same time the disk is slowed during time period 1090. Because the MR heads are unloaded from the same position, the MD, the MR heads are more consistently parked upon the load/unload heads. When the MR heads are initially located near the OD, this technique is called reverse-forward parking, as the MR heads are first moved away from the load/unload ramp (reverse), and then moved toward the load/unload ramp (forward). Further information regarding the general concept of reverse-forward parking of MR heads upon power down is disclosed in pending application Ser. No. 09/075,855, filed May 11, 1998 entitled Reverse-Forward Power-Off Method and Device for Electronic Storage Apparatus, assigned to the same assignees. Application Ser. No. 09/075,855 is incorporated by reference for all purposes. In other embodiments, other positions other than the M.D. can be used.

The embodiment in FIG. 12*b* also includes the parking speed range concept discussed above. Other combinations of the above techniques shown in FIGS. 9*a*–*b*, 11*a*–*b*, 12*a*–*b*, etc. may be advantageously used in other embodiments of the present invention.

In other embodiments, the velocity of read/write head movement may vary between on-disk movements and off-disk movements. Thus, the slopes of the lines in FIGS. 9*a*–*b*, 11*a*–*b*, and 12*a*–*b* may vary from those shown.

The presently claimed inventions may also be applied to other areas of technology such as mass storage systems for storage of video data, audio data, textual data, program data, or any computer readable data in any reproducible format.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for unloading read/write heads from a surface of a removable magnetic disk, the removable magnetic disk coupled to a spindle motor, comprising:

using the spindle motor to rotate the removable magnetic disk at approximately a first number of revolutions per minute;

positioning the read/write heads adjacent the surface of the removable magnetic disk;

receiving a head unload signal;

using the spindle motor to rotate the removable magnetic disk at approximately a second number of revolutions per minute in response to the head unload signal;

after a first predetermined amount of time after receiving the head unload signal, biasing the read/write heads towards an outer edge of the removable magnetic disk while using the spindle motor to maintain the rotation of the removable magnetic disk at approximately the second number of revolutions per minute; and after a second predetermined amount of time after receiving the head unload signal, using the spindle motor to dynamically brake the removable magnetic disk from approximately the second number of revolutions per minute;

wherein the first number of revolutions per minute is greater than the second number of revolutions per minute.

2. The method of claim 1 wherein biasing the read/write heads further comprises biasing the read/write heads onto a load/unload ramp.

3. The method of claim 1 further comprising:

before biasing the read/write heads towards the outer edge of the removable magnetic disk, biasing the read/write heads towards an inner edge of the removable magnetic disk.

4. The method of claim 1 further comprising:

before biasing the read/write heads towards the outer edge of the removable magnetic disk, biasing the read/write heads towards a middle of the removable magnetic disk.

5. A method for repositioning read/write heads from a parking location to a position adjacent a surface of a removable magnetic disk, the removable magnetic disk coupled to a spindle motor, comprising:

receiving a read/write heads load signal;

using the spindle motor to accelerate the removable magnetic disk to at least a first number of revolutions per time period, in response to the read/write heads load signal;

thereafter using the spindle motor to maintain rotation of the removable magnetic disk within a range of the first number and a second number of revolutions per time period, the second number greater than the first number;

biasing the read/write heads towards the position adjacent the surface of the removable magnetic disk after using the spindle motor to accelerate the removable magnetic disk to at least the first number of revolutions per time period and during using the spindle motor to maintain rotation of the removable magnetic disk within the range of the first number and the second number of revolutions per time period; and using the spindle motor to accelerate the removable magnetic disk to a third number of revolutions per time period, after biasing the read/write heads, the third number greater than the second number.

6. The method of claim 5 wherein biasing the read/write heads comprises unloading the read/write heads from a load/unload ramp.

7. The method of claim 5 wherein the first number of revolutions per time period is approximately 1000 revolutions per second.

8. The method of claim 7 wherein the second number of revolutions per time period is approximately 1500 revolutions per second.

9. A system having a storage device including read/write heads for repositioning the read/write heads from a parking location to a position adjacent a surface of a removable magnetic disk, the storage device further comprising:

a spindle motor coupled to the removable magnetic disk, for accelerating and maintaining the removable magnetic disk to at least a first number of revolutions per time period while the read/write heads are positioned at the parking location; and a solenoid control coupled to the read/write heads and to the spindle motor, for biasing the read/write heads towards the position adjacent the surface of the removable magnetic disk after the removable magnetic disk reaches the first number of revolutions per time period;

wherein the spindle motor maintains a rotation of the removable magnetic disk within a range of the first number and a second number of revolutions per time period after the read/write heads are biased towards the position adjacent the surface of the removable magnetic disk and before the read/write heads are positioned adjacent the surface of the removable magnetic disk, the second number greater than the first number, and wherein the spindle motor accelerates the removable magnetic disk to a third number of revolutions per time period after the read/write heads are positioned adjacent the surface of the removable magnetic disk, the third number greater than the second number.

10. The system of claim 9 wherein the parking location is on a load/unload ramp.

11. The system of claim 9 wherein the solenoid control is also for loading the read/write heads onto the removable magnetic disk.

12. The method of claim 9 wherein the first number of revolutions per time period is approximately 1000 revolutions per second.

13. The method of claim 9 wherein the second number of revolutions per time period is approximately 1500 revolutions per second.

14. The system of claim 9 wherein the parking location is located at an inner crash stop.

* * * * *